United States Patent
Henderson et al.

(10) Patent No.: US 7,469,350 B2
(45) Date of Patent: Dec. 23, 2008

(54) POWER CONTROL INTERFACE FOR A SELF-SERVICE APPARATUS

(75) Inventors: Jim Henderson, Fife (GB); Mike Taylor, Dundee (GB); Michael McBride, Dundee (GB); Graeme Mitchell, Dundee (GB)

(73) Assignee: NCR Corporation, Dayton, OH (US)

( * ) Notice: Subject to any disclaimer, the term of this patent is extended or adjusted under 35 U.S.C. 154(b) by 517 days.

(21) Appl. No.: 11/315,901

(22) Filed: Dec. 22, 2005

(65) Prior Publication Data

US 2007/0150758 A1    Jun. 28, 2007

(51) Int. Cl.
G06F 1/26 (2006.01)

(52) U.S. Cl. .................... 713/300; 713/310; 713/320; 713/324

(58) Field of Classification Search ................ 713/300, 713/310, 320
See application file for complete search history.

(56) References Cited

U.S. PATENT DOCUMENTS

| | | | | |
|---|---|---|---|---|
| 5,884,086 | A * | 3/1999 | Amoni et al. | 713/300 |
| 6,105,143 | A * | 8/2000 | Kim | 713/324 |
| 6,480,965 | B1 * | 11/2002 | Harriman et al. | 713/322 |
| 6,735,720 | B1 * | 5/2004 | Dunn et al. | 714/43 |
| 7,177,973 | B2 * | 2/2007 | Jackson | 710/313 |
| 7,222,268 | B2 * | 5/2007 | Zaifman et al. | 714/47 |
| 7,320,077 | B2 * | 1/2008 | Kim | 713/300 |
| 7,346,728 | B1 * | 3/2008 | Jackson | 710/313 |
| 2004/0207440 | A1 * | 10/2004 | Robertson et al. | 327/291 |
| 2005/0289257 | A1 * | 12/2005 | Fink | 710/62 |

FOREIGN PATENT DOCUMENTS

JP        2005352942 A    * 12/2005

\* cited by examiner

*Primary Examiner*—Nitin C Patel
(74) *Attorney, Agent, or Firm*—Priest & Goldstein PLLC

(57) ABSTRACT

A particular problem for self-service devices incorporating USB devices (12) and a USB host (14) is that, when communication is lost between the USB host and one or more of the devices it is difficult (in particular situations) to reset those USB devices without manual intervention. We address that problem by using self-powered USB devices and/or bus powered devices connected to USB hubs, and by creating a power control interface (18) which is itself a USB device. That power control interface takes instructions from the USB host and is able to interrupt a power supply (20) to the USB devices to provoke automatic reset of those devices. Additionally, a watchdog application within the power control interface causes reset of that interface should it malfunction. Also, a master watchdog application at the USB host communicates with a slave watchdog application at the power control interface via a USB link. In the event of cessation of heartbeat signals between the master and slave the power control interface sends a hardware reset signal to the USB host.

18 Claims, 4 Drawing Sheets

POWER CONTROL INTERFACE FOR A SELF-SERVICE APPARATUS

TECHNICAL FIELD

The present invention relates to power control interfaces for self-service apparatus. It is particularly related to, but in no way limited to, controlling a power supply in a self-service apparatus in order to reset USB devices at the self-service apparatus.

BACKGROUND

Self-service apparatus such as automated teller machines (ATMs), self-service kiosks, pay-as-you-go photocopiers, fax machines, internet terminals and the like typically comprise one or more sub-assemblies such as printers, card readers, cash dispensers and so on. Increasingly those sub-assemblies are provided as universal serial bus (USB) devices with an associated USB host in the form of a computer being at the self-service device.

In some situations communication loss or break down occurs between the USB devices and host in the self-service device. This is problematic because the sub-assemblies are then without the control of the host and operation of the self-service device is either prevented or curtailed.

The USB protocol itself provides some methods for resetting USB devices in order to try to re-establish communication over the USB link. However, these methods are often ineffective, for example, if the USB device is malfunctioning or not responding over the USB link. This is particularly problematic for self-service devices because a field engineer or operative must attend the site of the apparatus and manually reset the USB devices. This is time consuming and expensive.

USB connections are widely used today to enable connections between Personal Computers (PCs) and peripheral devices such as telephones, digital cameras, scanners, keyboards, mice and PDAs. The USB specification was developed by a group of companies including Compaq, Intel, Microsoft and NEC and the USB specification documents such as USB 1.1 and USB 2.0 are publicly available. The USB specification describes the bus attributes, protocol definition, transaction types, bus management and programming interface required to comply with the standard. Using this standard it is possible to provide a fast bi-directional, isochronous, low cost, dynamically attachable serial interface between a PC platform and one or more devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

As mentioned above, a particular problem for self-service devices incorporating USB devices and a USB host is that, when communication is lost between the USB host and one or more of the devices it is difficult (in particular situations) to reset those USB devices without manual intervention. We address that problem by using self-powered and/or bus-powered USB devices and by creating a power control interface which is itself a USB device. That power control interface takes instructions from the USB host and is able to interrupt a power supply to the USB devices to provoke automatic reset of those devices. Additionally, a watchdog application within the power control interface causes reset of that interface should it malfunction. Also, a master watchdog application at the USB host communicates with a slave watchdog application at the power control interface via a USB link. In the event of cessation of heartbeat signals between the master and slave the power control interface sends a hardware reset signal to the USB host.

A power control interface is described for use in a self-service apparatus. The power control interface is arranged to control a power supply in the self-service apparatus. The power supply is for powering one or more secondary USB devices in the self-service apparatus (such as card readers, cash dispensers, receipt printers or other devices). The power control interface comprises:
- a USB connector for connection to a USB hub connected to a computer in the self-service apparatus;
- an output arranged to output commands to the power supply; and
- a processor arranged to issue commands to the output on the basis of communications received from the USB hub.

For example, the processor is arranged to issue at least some commands to the output in order to cause interruption of the power supply and provoke reset of some or all of the secondary USB devices. This provides the advantage that it is possible to reset those USB devices automatically without the need for manual intervention by a field engineer or operative.

Preferably the power control interface is itself a USB device and it can take the form of a printed circuit board or equivalent apparatus.

In an example the power control interface comprises a central processing unit with an associated watchdog system arranged to provoke a reset of the power control interface in the event of malfunction of that interface. For example, the power control interface is powered from an auxiliary power source and is therefore not reset when the main DC power is removed. This watchdog system enables reset of the power control interface should it be required.

Preferably the watchdog comprises heartbeat signal generating means, heartbeat signal monitoring means and reset provoking means arranged to provoke the reset if the heartbeat signal ceases for more than a predetermined time.

In another example the power control interface comprises a slave watchdog application arranged to receive heartbeat signals over a USB link from a host PC and to send a hardware reset signal to the host PC in the event that the heartbeat signal ceases for more than a predetermined period of time. This enables the host PC to be reset and rebooted if required.

The invention also encompasses a self-service apparatus comprising:
- one or more secondary USB devices;
- a power supply arranged to self-power at least the secondary USB devices;
- a computer being a USB host;
- a power control interface connected via a USB connection to the computer and also connected to the power supply; wherein the power control interface is arranged to cause interruption of the power supply when instructed to do so by the computer; and wherein the computer is arranged to instruct the power control interface to cause such an interruption when it detects a loss of USB communication with one or more of the secondary USB devices.

In an example, the power supply comprises a switching means such that the power supply to selected ones of the secondary USB devices can be interrupted. For example, if there are several secondary USB devices at the self-service apparatus then it is possible to only reset the particular one of those which loses communication with the USB host.

In an example of the self-service apparatus the power control interface comprises a central processing unit with an associated watchdog system arranged to provoke a reset of the power control interface in the event of malfunction of that interface.

In an example of the self-service apparatus the power control interface comprises a slave watchdog application and the USB host comprises a master watchdog application.

For example, the master watchdog application is arranged to send heartbeat signals to the slave watchdog application and the slave watchdog application is arranged to send a hardware reset signal to the USB host in the event that the heartbeat signals cease for more than a predetermined time period.

The invention also encompasses a method of operating a power control interface in a self-service apparatus, said self-service apparatus comprising a power supply for powering one or more USB devices; said method comprising the steps of:

receiving instructions over a USB connection from a computer in the self-service apparatus; and outputting commands to the power supply on the basis of the received instructions.

For example, the output commands cause the power supply to be interrupted such that in use, one or more of the USB devices are provoked to reset. This is achieved automatically without the need for manual intervention by a field engineer.

In an example the output commands are arranged to activate switching means at the power supply to selectively interrupt power to one or more of the USB devices.

Computer software or firmware is also provided, arranged to control a power control interface in order to carry out the methods described above.

This acknowledges that software can be a valuable, separately tradable commodity. It is intended to encompass software, which runs on or controls "dumb" or standard hardware, to carry out the desired functions, (and therefore the software essentially defines the functions of the register, and can therefore be termed a register, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

DETAILED DESCRIPTION

Embodiments of the present invention are described below by way of example only. These examples represent the best ways of putting the invention into practice that are currently known to the Applicant although they are not the only ways in which this could be achieved.

As mentioned above, a particular problem for self-service devices incorporating USB devices and a USB host is that, when communication is lost between the USB host and one or more of the devices it is difficult (in particular situations) to reset those USB devices without manual intervention. We address that problem by using self-powered USB devices and/or bus powered devices connected to USB hubs and by creating a power control interface which is itself a USB device. That power control interface takes instructions from the USB host and is able to interrupt a power supply to the USB devices to provoke automatic reset of those devices.

Figure 1:
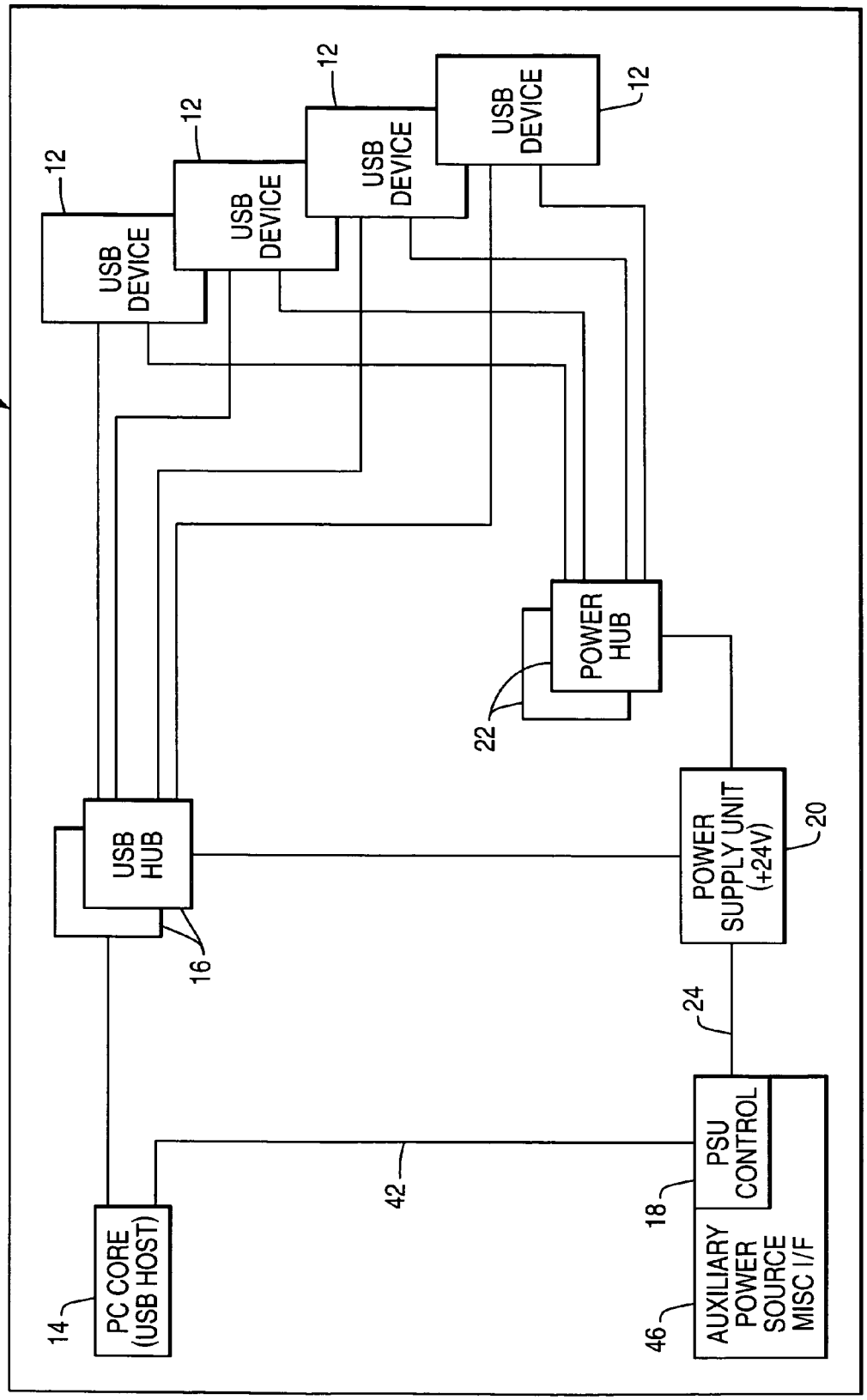
FIG. 1 is a schematic diagram of a self-service apparatus with a plurality of USB devices.

FIG. 1 is a schematic diagram of a self-service apparatus 10 with a plurality of secondary USB devices 12. A USB host 14 is provided as well as USB hubs 16 and a power control interface 18 as explained in more detail below. The secondary USB devices 12 take any suitable form such as card readers, cash dispensers, receipt printers and the like.

The self-service apparatus 10 also comprises a personal computer (PC) the core 14 of which is illustrated in FIG. 1 and is referred to herein as a USB host. Connected to this USB host are one or more USB hubs 16 using USB connections as known in the art. Each of the secondary USB devices 12 is in turn connected using a USB connection to one of the USB hubs 16 also as known in the art.

As known in the art, it is possible for a USB device to be either self-powered or powered via its USB connection (i.e. over the universal serial bus itself). For example, a mouse connected to a PC is typically powered over its USB from the PC's own power supply. We provide the secondary USB devices as both self-powered devices and bus powered devices connected to the hubs 16. In order to achieve this we use a power supply unit 20 in the self-service apparatus 10. The power supply unit is of any suitable type and in this example provides a DC supply at +24V from a mains powered, switch mode, power supply unit. However, this is not essential, any suitable type of power supply unit can be used.

The power supply unit 20 is connected via one or more power hubs 22 to each of the secondary USB devices 12. In this way the power supply unit powers each of the secondary USB devices 12 which are thus self-powered.

Bus powered USB devices can also be used connected directly to, and deriving their power from, the USB hubs (16). Since the USB Hub power can be interrupted by this means, so also the power to any bus-powered devices connected in this way.

In the example illustrated in FIG. 1 the power supply unit is also connected to the USB hubs 16 providing power to those devices.

The PC core 14 is also connected to a power control interface 18 via a USB connection 42. The power control interface 18 is preferably itself a USB device and derives its power from an independent auxiliary supply 46.

The power control interface 18 is preferably provided in the form of a printed circuit board which may also support other functionality (indicated in FIG. 1 as Misc I/F) although this is not essential.

The power control interface 18 is connected to the power supply unit 20 over any suitable type of connection 24. It is arranged such that it can send commands to the power supply unit to cause interruption of the power supply to the secondary USB devices 12 and the USB hubs 16. In one example, the power supply unit 20 comprises a switching means in order that it can selectively interrupt the power supply to one or more particular ones of the secondary USB devices 12 and USB hubs 16.

Operation of the apparatus of FIG. 1 to automatically reset the secondary USB devices 12 is now described with reference to the flow diagram of FIG. 2.

Figure 2:
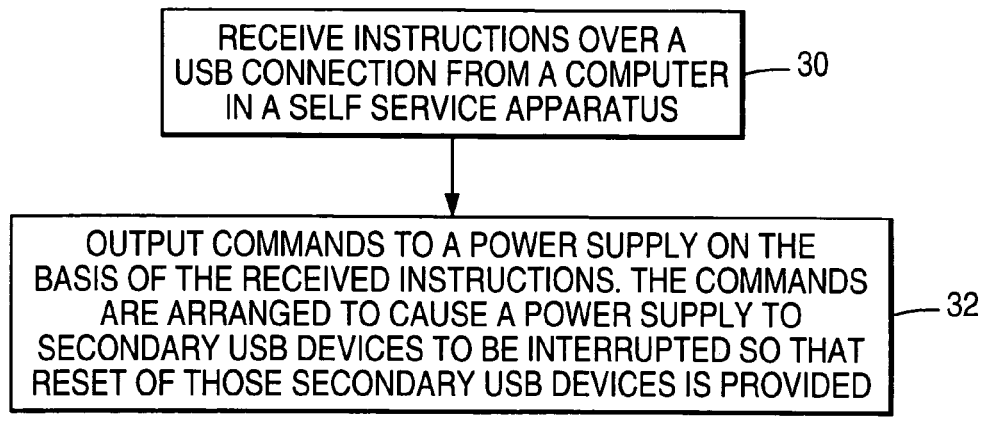
FIG. 2 is a flow diagram of a method of operating a power control interface.

The power control interface 18 receives instructions over a USB connection 42 from a computer 14 in the self-service apparatus 10 (see step 30 in FIG. 2). It then outputs commands to a power supply unit 20 on the basis of the received USB instructions. The commands are arranged to cause the power supply 20 to secondary USB devices 12 to be interrupted so that reset of those secondary USB devices is provoked automatically (see box 32 in FIG. 2).

Figure 3:
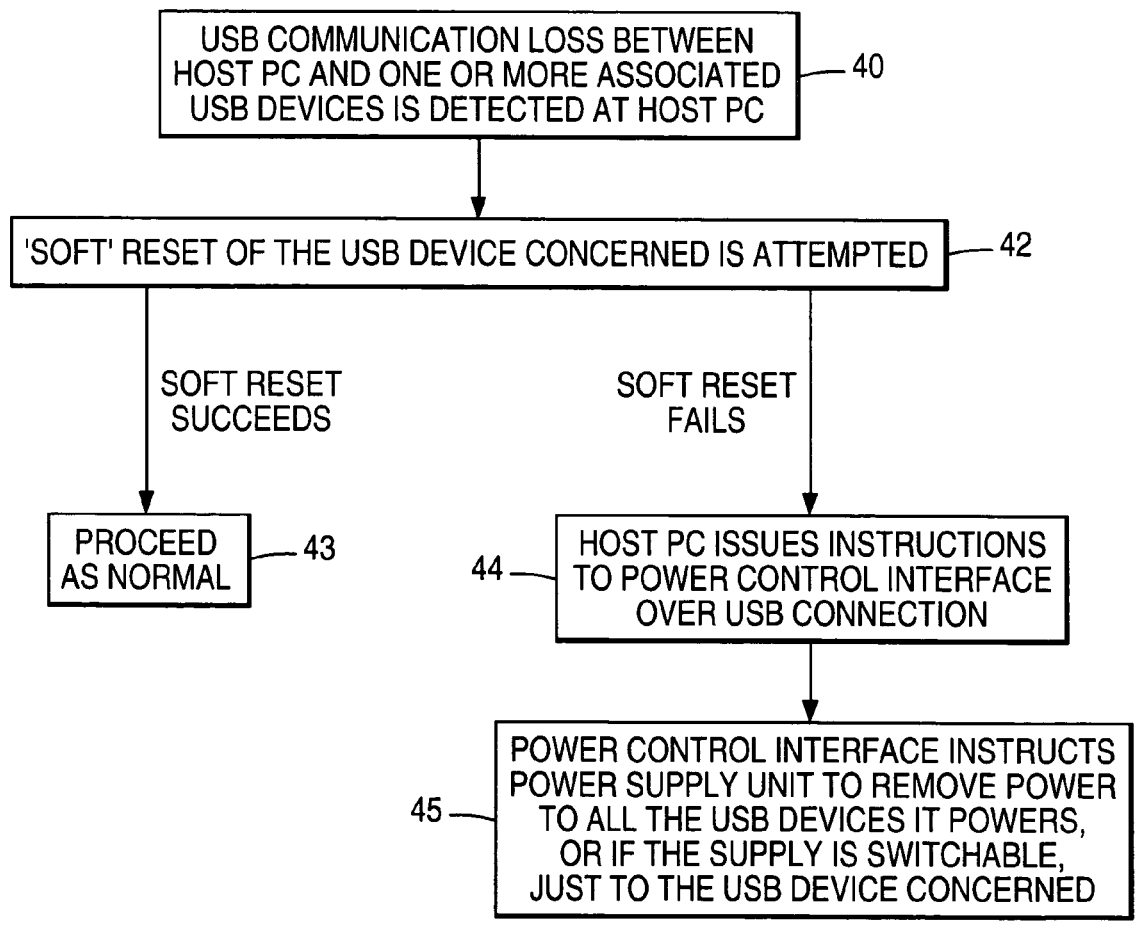
FIG. 3 is a flow diagram of a method of operating a self-service apparatus.

FIG. 3 is a flow diagram of a high level method of operating the self-service apparatus 10. At the host PC 14 the USB host detects a USB communication loss between itself and one or more associated USB devices (those associated USB devices being the USB hubs 16, secondary USB devices 12 and the power control interface 18). This step is illustrated as box 40 in FIG. 3. This loss of USB communication is detected as known in the art. For example, following USB protocol, if USB attempts to send the same packet three times to a device without receiving acknowledgement of receipt then communication is assumed to be lost. Following USB protocol, a "soft" reset of the device concerned is then attempted as known in the art. This involves sending communications over the USB link to attempt to reset the device (see step 42 of FIG. 4). However, if the device has malfunctioned such a "soft" reset typically fails. Also, if the USB link is lost then the "soft" reset command may not reach the device.

Figure 4:
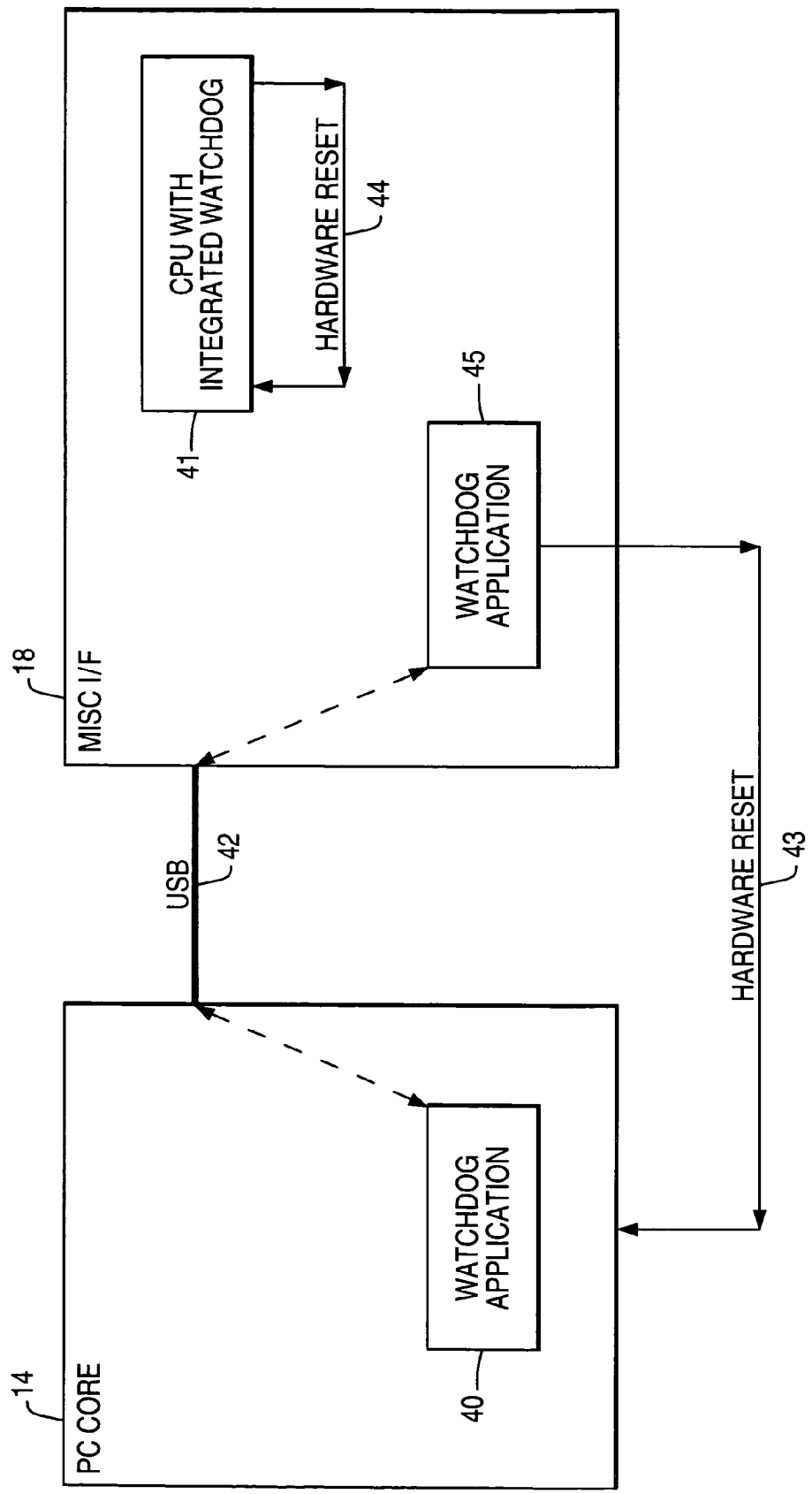
FIG. 4 is a schematic diagram of a PC core and a power control interface.

If the "soft" reset succeeds then the self-service apparatus proceeds to operate as normal (see box 43 of FIG. 4). If the "soft" reset fails (box 44) then the host PC issues instructions to the power control interface 18 over the USB connection. The power control interface then instructs the power supply unit 20 to remove power to all the USB devices it powers, or, if the power supply is switchable, just to the USB device concerned. (See box 45 of FIG. 4.)

The instructions sent from the host PC to the power control interface 18 over a USB connection use standard USB protocol The commands issued to effect the power supply interruption are specific to the driver in the host PC and the firmware in the power control interface which provides the power supply control.

In some situations, the secondary USB devices may have their own auxiliary power supply which comes into action only if the usual source of power to the USB device fails. For example, this is typically the case for card readers which are required to return cards to a user in the event of shut down of the self-service apparatus or the card reader itself. In order to return the card in that type of event, battery power is used to achieve card return. Advantageously, the present invention is operable even with secondary USB devices of this type, with their own battery power for failure situations. In that case, interruption of power from the power supply unit 20 is still able to provoke reset of the USB device automatically.

Because the power control interface 18 receives its power from its auxiliary power source 46 it does not experience restart as a result of interruption of the power supply from unit 20. Therefore, in order to reset the power control interface 18 itself when required, an integrated self-reset mechanism is provided in the power control interface.

FIG. 4 shows the PC core 14 of FIG. 1 and the power control interface 18 of FIG. 1 in more detail. Preferably, but not essentially, the power control interface central processing unit (CPU) has an associated watchdog 41. This hardware and/or software watchdog function 41 detects a malfunction of the power control interface (and, or any other functionality integrated with the power control interface as mentioned above) and generates a reset 44 of the hardware associated with the power control interface 18. This is explained in more detail with reference to FIG. 5.

Figure 5:
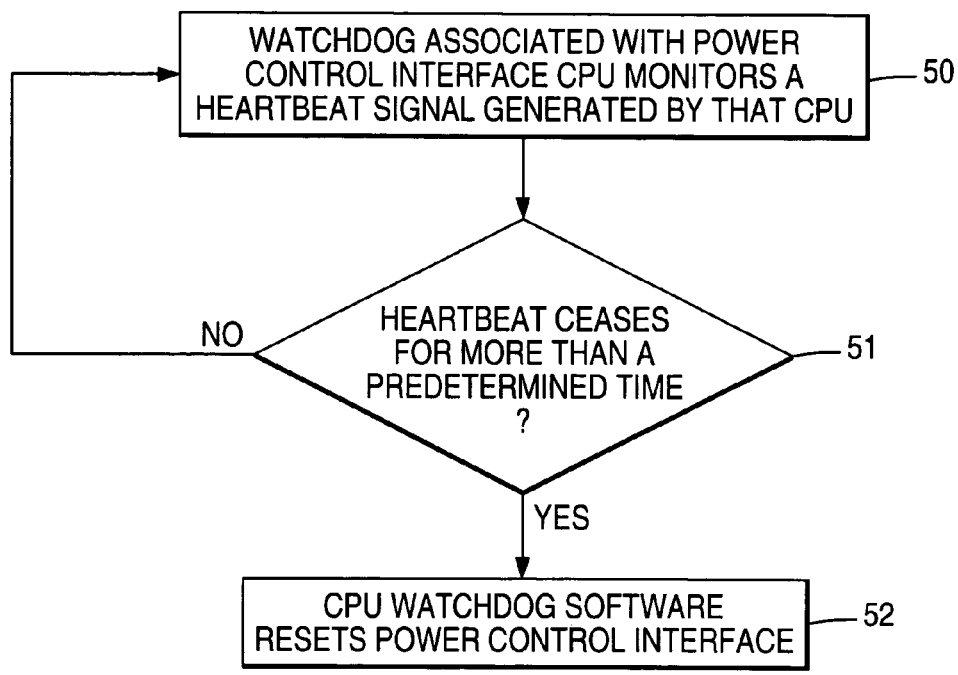
FIG. 5 is a flow diagram of a method of resetting a power control interface.

FIG. 5 is a flow diagram of a method of resetting the power control interface and associated hardware. A dedicated piece of hardware (part of the watchdog 41) monitors a heartbeat signal (see box 50) generated by onboard software and if this heartbeat ceases for more than a predetermined time (box 51) then the watchdog software resets the power control interface 18 and associated hardware (box 52).

In a preferred embodiment the host PC 14 is also protected against hang conditions by two communicating watchdog applications, one of which runs on the PC 14 and the other which runs on the power control interface board 18. These watchdog applications communicate with each other over a USB link 42 and if communication fails for greater than a predetermined time then the power control interface watchdog application generates a hardware reset signal to reset and reboot the PC 14. Thus FIG. 4 shows a watchdog application 40 at the PC 14 and a watchdog application 45 at the power control interface board 18. Watchdog signaling occurs between the watchdog applications 40, 45 over the USB link 42 via the dotted lines in FIG. 4. Hardware reset is illustrated schematically by line 43 in FIG. 4.

Figure 6:
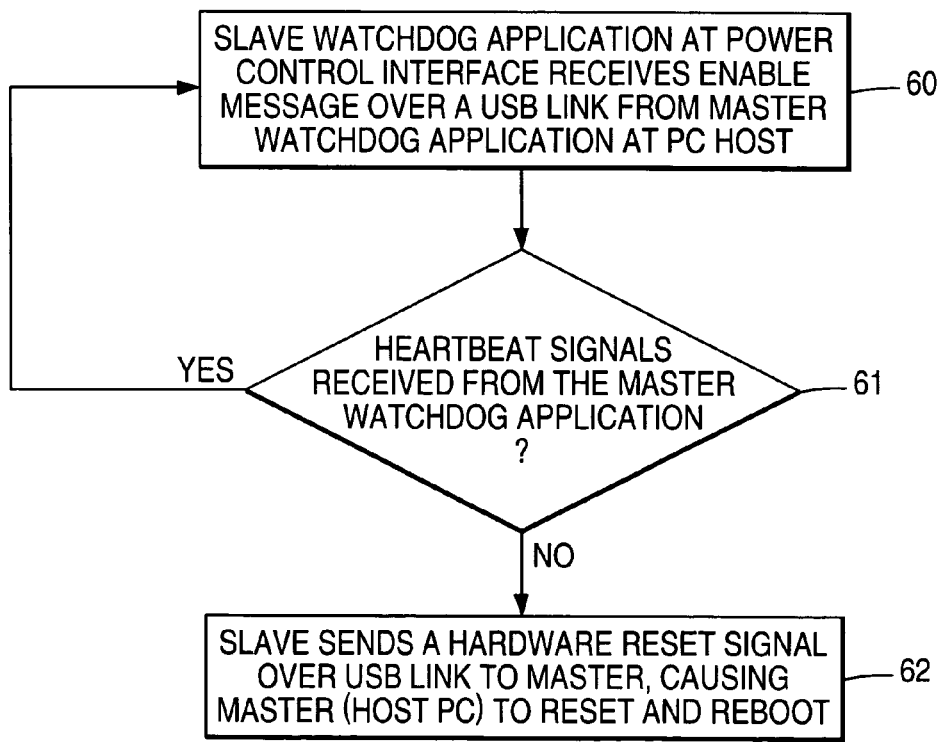
FIG. 6 is a flow diagram of a method of resetting and rebooting a host PC.

More detail about the method of resetting and rebooting the PC 14 is given with reference to FIG. 6. The PC resident watchdog application is the watchdog master 40 and the power control interface resident watchdog application is referred to as a slave 45. To start the protection scheme the master 40 sends an enable message over the USB link 42 to the slave and from this point onwards the master sends a regular heartbeat message to the slave. If the heartbeat message ceases (see boxes 60 and 61 of FIG. 6) for more than a predetermined time the slave generates a hardware reset signal which causes the PC 14 to reset and reboot (see box 62). Under certain conditions, such as System Escape, it is necessary to stop the heartbeat messages, the solution therefore implements a disable command which can be sent from the master to the slave.

Any range or device value given herein may be extended or altered without losing the effect sought, as will be apparent to the skilled person.

It will be understood that the above description of a preferred embodiment is given by way of example only and that various modifications may be made by those skilled in the art.

What is claimed is:

1. A power control interface for use in a self-service apparatus, said power control interface being arranged to control a power supply in the self-service apparatus, said power supply powering plural secondary universal serial bus (USB) devices in the self-service apparatus utilizing an independent power connection separate from any USB connections to each of said plural secondary USB devices, said power control interface comprising:

(i) a USB connector for connection to a USB host being a computer in the self-service apparatus;
 (ii) an output arranged to output commands to the power supply;

(iii) a processor arranged to issue commands to the output on the basis of communications received from the USB host, including commands for selectively controlling power provided by the power supply to one of the secondary USB devices utilizing the independent power connection for said USB device.

2. A power control interface as claimed in claim 1, wherein the processor is arranged to issue at least some commands to the output in order to cause interruption of the power supply and provoke reset of some or all of the secondary USB devices.

3. A power control interface as claimed in claim 1, which is itself a USB device.

4. A power control interface as claimed in claim 1, which comprises a printed circuit board.

5. A power control interface as claimed in claim 1, which comprises a central processing unit with an associated watchdog system arranged to provoke a reset of the power control interface if the power control interface malfunctions.

6. A power control interface as claimed in claim 5, wherein said watchdog comprises heartbeat signal generating means, heartbeat signal monitoring means and reset provoking means arranged to provoke the reset if the heartbeat signal ceases for more than a predetermined time.

7. A power control interface as claimed in claim 1, which further comprises a slave watchdog application arranged to receive heartbeat signals over a USB link from a host personal computer (PC) and to send a hardware reset signal to the host PC in the event that the heartbeat signal ceases for more than a predetermined period of time.

8. A self-service apparatus comprising:
   (i) one or more secondary universal serial bus (USB) devices;
   (ii) a power supply arranged to self-power the secondary USB devices, the power supply providing power to the secondary USB devices through a power connection independent of a USB connection to the devices;
   (iii) a computer being a USB host;
   (iv) a power control interface connected via a USB connection to the computer and also connected to the power supply; wherein the power control interface is arranged to cause interruption of the power supply when instructed to do so by the computer; and wherein the computer is arranged to instruct the power control interface to cause such an interruption when it detects a loss of USB communication with one or more of the secondary USB devices.

9. A self-service apparatus as claimed in claim 8, wherein said power supply comprises a switching means such that the power supply to selected ones of the secondary USB devices can be interrupted.

10. A self-service apparatus as claimed in claim 8, wherein the power control interface comprises a central processing unit with an associated watchdog system arranged to provoke a reset of the power control interface if the power control interface malfunctions.

11. A self-service apparatus as claimed in claim 8, wherein the power control interface comprises a slave watchdog application and the USB host comprises a master watchdog application.

12. A self-service apparatus as claimed in claim 11, wherein the master watchdog application is arranged to send heartbeat signals to the slave watchdog application and the slave watchdog application is arranged to send a hardware reset signal to the USB host in the event that the heartbeat signals cease for more than a predetermined time period.

13. A method of operating a power control interface in a self-service apparatus, said self-service apparatus comprising a power supply for powering one or more universal serial bus (USB) devices; said method comprising the steps of:
   (i) receiving instructions over a USB connection from a computer in the self-service apparatus; and
   (ii) outputting commands to the power supply on the basis of the received instructions, the commands including commands to control power to the devices through control of a power connection to the devices independent of a USB connection to the devices.

14. A method as claimed in claim 13, wherein said output commands cause the power supply to be interrupted such that in use, one or more of the USB devices are provoked to reset.

15. A method as claimed in claim 13, wherein the output commands are arranged to activate switching means at the power supply to selectively interrupt power to one or more of the USB devices.

16. A method as claimed in claim 13, which further comprises monitoring a heartbeat signal generated by the power control interface and resetting the power control interface in the event that the heartbeat signal ceases for more than a predetermined time period.

17. A method as claimed in claim 13, which further comprises monitoring a heartbeat signal received over a USB link from the computer in the self-service apparatus, and sending a hardware reset signal to the computer in the event that the heartbeat signal received over the USB link ceases for more than a predetermined time period.

18. A programmable medium programmed with instructions to control a power control interface in order to carry out the method of operating a power control interface in a self-service apparatus, said self-service apparatus comprising a power supply for powering one or more USB devices; said method comprising the steps of:
   (i) receiving instructions over a universal serial bus (USB) connection from a computer in the self-service apparatus; and
   (ii) outputting commands to the power supply on the basis of the received instructions, the commands including commands to control power to the devices through control of a power connection to the devices independent of a USB connection to the devices.

* * * * *